United States Patent
Kwon (10) Patent No.: US 8,429,644 B2
(45) Date of Patent: Apr. 23, 2013

(54) IMAGE FORMING APPARATUS, AND WEB APPLICATION INSTALLING METHOD

(75) Inventor: Jung-hyuk Kwon, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 988 days.

(21) Appl. No.: 12/480,860

(22) Filed: Jun. 9, 2009

(65) Prior Publication Data

US 2010/0107152 A1    Apr. 29, 2010

(30) Foreign Application Priority Data

Oct. 28, 2008    (KR) .................. 10-2008-0105839

(51) Int. Cl.
*G06F 9/45*        (2006.01)
(52) U.S. Cl.
USPC ............................................ 717/174
(58) Field of Classification Search .............. 717/174
See application file for complete search history.

(56) References Cited

U.S. PATENT DOCUMENTS

| 7,246,351 | B2 * | 7/2007 | Bloch et al. | 717/175 |
| 8,127,288 | B2 * | 2/2012 | Moore et al. | 717/178 |
| 2004/0109138 | A1 * | 6/2004 | Kiser et al. | 353/31 |
| 2008/0098389 | A1 * | 4/2008 | Akiyoshi et al. | 717/175 |
| 2008/0117461 | A1 * | 5/2008 | Mitsutake et al. | 358/1.16 |

* cited by examiner

*Primary Examiner* — John Chavis
(74) *Attorney, Agent, or Firm* — Staas & Halsey LLP (57) ABSTRACT

A web application processing method, the web application processing method including: receiving web application information regarding a web application; accessing a web page for the web application using the web application information; reading contents from the web page; generating a virtual application corresponding to the web application using the read contents; and installing the generated virtual application in an image forming apparatus. Therefore, it is possible for a user to easily install a web application using uniform resource locator (URL) information, thereby increasing user convenience.

21 Claims, 4 Drawing Sheets

IMAGE FORMING APPARATUS, AND WEB APPLICATION INSTALLING METHOD

CROSS-REFERENCE TO RELATED APPLICATION

This application claims the benefit of Korean Application No. 10-2008-0105839, filed Oct. 28, 2008 in the Korean Intellectual Property Office, the disclosure of which is incorporated herein by reference.

BACKGROUND OF THE INVENTION

1. Field of the Invention

Aspects of the present invention relate to an image forming apparatus and a web application installing method, and more particularly, to an image forming apparatus to read contents from a web page and to generate a virtual application so as to provide a web service associated with the virtual application, and a web application installing method.

2. Description of the Related Art

Generally, image forming apparatuses print print data generated by terminal devices (such as computers), onto print media. Examples of such image forming apparatuses include copiers, printers, facsimile machines, and multifunction peripherals (MFPs) that combine operations of copiers, printers, and/or facsimile machines in a single system.

Recent image forming apparatuses are mounted with open architecture platforms that enable installation of various programs in addition to generally installed programs to provide additional services. However, to install such additional services in image forming apparatuses, users need to be provided with applications that provide these services from developers or manufacturers, and need to install the applications, resulting in an inconvenience to the users.

Additionally, image forming apparatuses have recently been able to display external applications of external web servers on built-in web browsers using HyperText transport protocol (HTTP) technologies. However, in this situation, users can only use such applications in external web servers, and cannot reconstruct a variety of contents existent on web sites.

SUMMARY OF THE INVENTION

Aspects of the present invention provide an image forming apparatus to read contents from a web page and generate a virtual application in order to provide web services associated with the virtual application, and a web application installing method.

According to an aspect of the present invention, there is provided a web application installing method of an image forming apparatus, the method including: accessing a web page for a web application using web application information regarding the web application; reading contents from the web page; generating a virtual application corresponding to the web application using the read contents; and installing the generated virtual application in the image forming apparatus.

According to an aspect of the present invention, the reading of the contents may include reading information regarding a uniform resource locator (URL), a title, and/or icons of the web page using HyperText Markup Language (HTML) information in the web page.

According to an aspect of the present invention, the reading of the contents may include reading some or all contents from the web page, and some or all contents from another web page linked to the web page.

According to an aspect of the present invention, the virtual application may be an application to display the read contents and/or the web page.

According to an aspect of the present invention, the method may further include displaying, on the image forming apparatus, an icon corresponding to the generated virtual application.

According to an aspect of the present invention, the method may further include, receiving a request to execute the installed virtual application, and providing a service associated with the virtual application in response to the received request.

According to an aspect of the present invention, the providing of the service may include displaying contents read from the web page corresponding to the virtual application, or displaying some contents from among the read contents in accordance with a user's selection.

According to an aspect of the present invention, the method may further include accessing the web page corresponding to the installed virtual application in preset regular intervals, and updating the contents associated with the installed virtual application according to changes to the web page.

According to an aspect of the present invention, the method may further include managing a service associated with the virtual application in response to a command to manage the installed virtual application.

According to another aspect of the present invention, there is provided an image forming apparatus including: a user interface to receive web application information regarding a web application; a communication interface to access a web page for the web application using the web application information; a contents reader to read contents from the web page; a virtualization engine to generate a virtual application corresponding to the web application using the read contents; and a controller to install the generated virtual application in the image forming apparatus.

According to an aspect of the present invention, the contents reader may read information regarding a uniform resource locator (URL), a title, and/or icons of the web page using HyperText Markup Language (HTML) information in the web page.

According to an aspect of the present invention, the contents reader may read some or all contents from the web page, and some or all contents from another web page linked to the web page.

According to an aspect of the present invention, the virtual application may be an application to display the read contents and/or the web page.

According to an aspect of the present invention, the user interface may display an icon corresponding to the generated virtual application.

According to an aspect of the present invention, when receiving a request to execute the installed virtual application, the controller may provide a service associated with the virtual application in response to the received request.

According to an aspect of the present invention, the controller may display the contents read from the web page corresponding to the virtual application, or may display some contents from among the contents in accordance with a user's selection.

According to an aspect of the present invention, the controller may access the web page for the installed virtual application in preset regular intervals, and may update contents associated with the installed virtual application according to changes to the web page.

According to an aspect of the present invention, the controller may manage a service associated with the virtual application in response to a command to manage the installed virtual application.

According to yet another aspect of the present invention, there is provided a web application installing method of an image forming apparatus, the method including: generating a virtual application corresponding to a web application of a web page using contents read from the web page; and installing the generated virtual application in the image forming apparatus.

According to still another aspect of the present invention, there is provided a system to generate a virtual application corresponding to a web application, the system including: a web server to store the web page; and an image forming apparatus including: a user interface to receive web application information regarding a web application; a communication interface to access a web page for the web application using the web application information; a contents reader to read contents from the web page; a virtualization engine to generate a virtual application corresponding to the web application using the read contents; and a controller to install the generated virtual application in the image forming apparatus.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
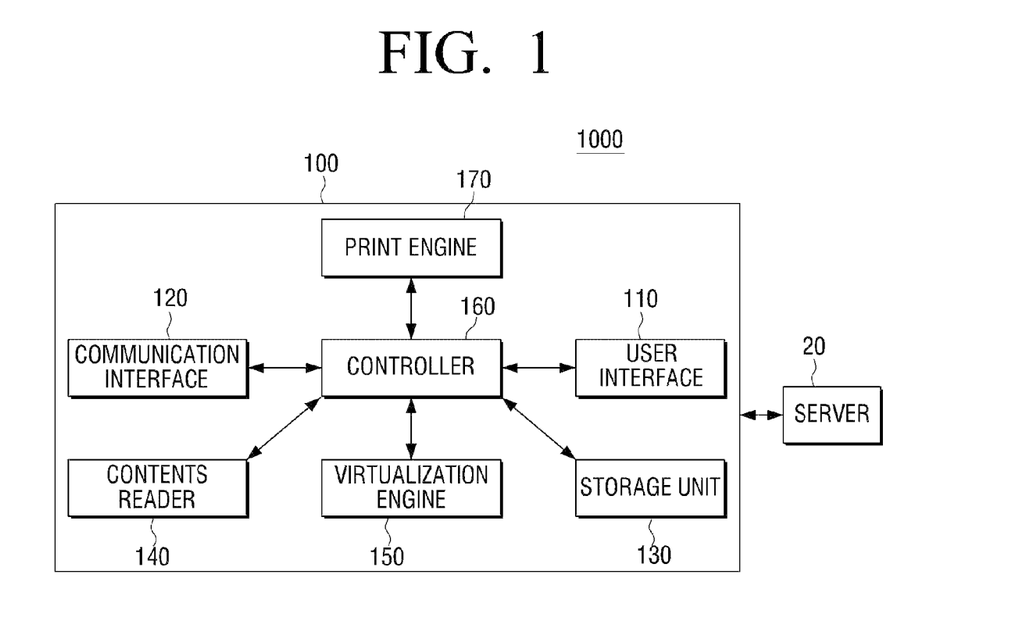
FIG. 1 illustrates a block diagram of a service system according to an embodiment of the present invention.

FIG. 1 illustrates a block diagram of a service system 1000 according to an embodiment of the present invention. Referring to FIG. 1, the service system 1000 includes an image forming apparatus 100 and a web server 20 connected to the image forming apparatus 100 using wired and/or wireless protocols. The web server 20 stores a web page on which a web application including a plurality of contents is implemented. Specifically, the web server 20 stores the web page that provides the image forming apparatus 100 with the web application, and may be implemented as a server, a personal computer (PC), a personal digital assistant (PDA), a mobile phone, a digital camera, a digital video camera, and/or a point of sale (POS) terminal. Here, the contents may include a plurality of information provided by the web page and the web application. For example, the contents may include a variety of information contained in a general HyperText Markup Language (HTML) file (such as a title of a web page, a uniform resource locator (URL) address of the web page, user interface information of the web page, and/or text data and images stored in the web page). The user interface information is used to inform a user of a web application provided by the web page, and the title or operations of the web page using icons. The user interface information may include information about the location of where icon data is stored, or may include the icon data itself. However, the language of the webpage is not limited to HTML.

Additionally, the application refers to a service provided by an open architecture platform. The open architecture platform is a platform that allows for adding, updating, and removing of components (i.e., applications) in a corresponding system, and an example of such an open architecture is that of the Open Services Gateway initiative (OSGi) (1999). When an open architecture platform is installed in an image forming apparatus, general operations provided by the image forming apparatus (for example, facsimile transmission, copying, or printing) are referred to as basic applications. Additionally, an operation to display a specific web page and an operation to display contents read from a specific web page are referred to as web applications accessible using the open architecture platform.

The web server 20 stores a web page in which a web application is launched, as described above. When a request to access the web page is received, the web server 20 provides the web page and contents contained in the web page. It is understood that aspects of the present invention are not limited thereto. For example, according to other aspects, the web page may be stored an external web server. Specifically, the web page may contain a link, and the link on the web page may be a web page of an external web server.

The image forming apparatus 100 accesses the web page using web application information, and reads contents of the accessed web page to install a virtual application. The image forming apparatus 100 may be a copier, a printer, a facsimile machine, or a multifunction peripheral (MFP) that combines operations of the copier, printer, and/or facsimile machine in a single system. Referring to FIG. 1, the image forming apparatus 100 includes a user interface 110, a communication interface 120, a storage unit 130, a contents reader 140, a virtualization engine 150, and a controller 160.

The user interface 110 includes one or more operation keys and/or input devices (such as a rotatable dial, a touch screen, etc.) through which a user is able to set and/or select various operations supported by the image forming apparatus 100. Furthermore, the user interface 110 displays a variety of information provided by the image forming apparatus 100. The user interface 110 may be implemented as an apparatus such as a touch pad, where both input and output can be implemented, and/or as an apparatus combining a mouse and a monitor. Moreover, the user interface 110 receives the web application information. In more detail, the user interface 110 generates a user interface window to receive information used to install the web application, and receives the web application information via the user interface window. Here, the web application information may include at least a URL address of the web page corresponding to the web application or a location of the web application in the web server 20. Additionally, the web application information may include various set values to determine the form of reading the contents or the form of launching an application. For example, set values may be used to determine whether an installed virtual application simply displays a web page corresponding to a web application; whether the virtual application reconstructs the contents of the web page and displays the reconstructed contents; whether the virtual application is executed off-line or on-line; and/or to determine how many stages of links of the web page should be read when the virtual application is executed on-line. These set values may be previously set, or may be received using the user interface 110.

The communication interface 120 connects the image forming apparatus 100 with the web server 20. The communication interface 120 may access a terminal device via a local area network (LAN) and/or Internet network, by using a universal serial bus (USB) port, and/or by using any other wired/wireless communication interface (such as infrared, Bluetooth, etc.). The communication interface 120 is connected to the web server 20, and accesses the web page corresponding to the web application. For example, when a web application install command is received from the web server 20 or via the user interface 110, the communication interface 120 may access the web page using the web application information received by the user interface 110 (in particular, using a web page URL where the web application is stored).

The storage unit 130 may store the web application information received by the user interface 110. Additionally, the storage unit 130 may temporarily store the web page accessed by the communication interface 120, and/or may store contents read from the accessed web page. The storage unit 130 may be implemented as a storage medium mounted in the image forming apparatus 100 or an external non-volatile storage medium (for example a removable disk including a USB memory, a hard disk drive (HDD) or a flash memory, a storage medium connected to a host device, or a web server on a network). Here, the web application information may be an address where the web application is stored in the web server 20, or a URL address provided in the form of a web page. Additionally, the web application install command and/or the web application information may be received from the web server 20, or a user may manually enter the web application install command and/or the web application information using the user interface 110.

The contents reader 140 reads contents from the accessed web page. Specifically, the contents reader 140 may read all of the contents contained in the web page, or may read only some of the contents based on web page information set by a user using HTML information in the web page. If a web page is written in HTML, information regarding a title, a link, images, and/or icons of the web page may be defined as tags. Accordingly, the contents reader 140 may classify contents contained in the web page using HTML information in the web page, and may also read all of the contents or only some of the contents according to a user selection or preset conditions. Additionally, a web page address, a web page title or web page icons among the read contents may be used as icons for virtual applications generated in the process that will be described later. If a web page corresponding to a web application includes a link, the contents reader 140 may control the communication interface 120 to access another web page linked to the web page, and may read contents from the accessed web page. Additionally, if the web page corresponding to the web application contains a plurality of links, the contents reader 140 may control the communication interface 120 to access all web pages within a preset range of stages of the plurality of links, and may read contents from the accessed web pages.

The virtualization engine 150 generates a virtual application using the read contents. In more detail, the virtual application may be an application to display a predetermined web page, an application to display prestored contents, or a combination application thereof. For example, if an open architecture platform installed in the image forming apparatus 100 is an Open Services Gateway initiative (OSGi)-based framework, the virtualization engine 150 generates a virtual activator file to access web pages using the information regarding the web page URL, web page title, and web page icons, and compresses the virtual activator file into a virtual Java ARchive (JAR) file. An application to display a predetermined web page or an application to display image data and text data stored in the image forming apparatus 100 may be generated using a preset algorithm, of which detailed description is omitted herein.

The controller 160 installs the generated virtual application. Specifically, the controller 160 installs the generated virtual application in the open architecture platform in the image forming apparatus 100. The operation of installing the virtual application in the open architecture platform is performed in a similar manner to an operation of installing a general extension application in a platform, so no further description is herein provided. Additionally, the controller 160 controls the user interface 110 to display an icon representing the installed virtual application. For example, the controller 160 controls the user interface 110 so that information regarding the URL and/or the title of the web page among the contents read from the web page may be displayed in the form of icons. After receiving a command to manage the virtual application, the controller 160 manages a service associated with the virtual application. The command to manage the virtual application may include an execution command, a start command, a stop command, and/or an update command. Various management commands to manage a virtual application or an operation of managing services in response to management commands will be described later with reference to FIG. 4. While not required in all aspects, the controller 160 can include a processor or microprocessor executing a computer program stored in a computer-readable medium, such as the storage unit 130.

After receiving a command to execute the installed virtual application, the controller 160 provides a service associated with the virtual application. In more detail, when a user selects an icon corresponding to the virtual application, the controller 160 may control the user interface 110 to display the contents read from a web page corresponding to the virtual application, or to display specific contents from among the contents read from the web page. Additionally, the controller 160 may control the communication interface 120 to access the web page corresponding to the virtual application, and control the user interface 110 to display the accessed web page. In this situation, the controller 160 may control the user interface 110 to display only some of the contents read from the web page according to the set value used to install the virtual application.

As shown, the controller 160 also controls a print engine 170 to print the read contents or contents currently displayed on the user interface 110. However, it is understood that another controller of the image forming apparatus 100 can be used to control the print engine 170 instead of the controller 160. Additionally, the controller 160 may access the web page of the installed virtual application in preset regular intervals, and may update the contents associated with the installed virtual application. Specifically, if the web page of the installed virtual application is found to be updated after accessing the web page in preset regular intervals or after receiving a user command for the installed virtual application, the controller 160 may control the installed virtual application to be updated as well.

As described above, the image forming apparatus 100 may generate a virtual application using the contents read from a web page, and install the generated virtual application. Thus, it is possible for a user to easily install a web application in the image forming apparatus 100. Additionally, the image forming apparatus 100 may read the contents selectively from a web page for a web application, and store the read contents. Accordingly, it is possible to provide services even when the image forming apparatus 100 is not connected to an external web server.

Figure 2:
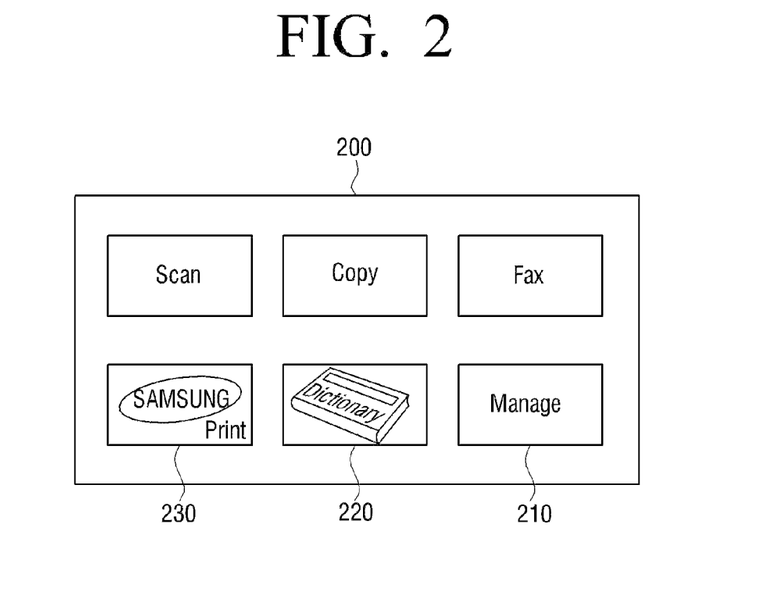
FIGS. 2 and 3 illustrate various examples of user interface windows to be displayed on an image forming apparatus according to an embodiment of the present invention.
Figure 3:
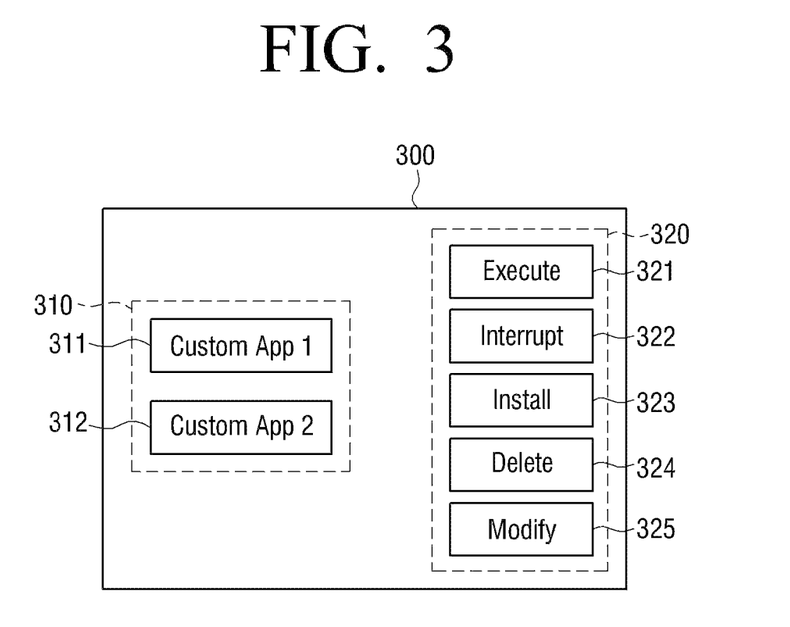

FIGS. 2 and 3 illustrate examples of a user interface window to be displayed on the image forming apparatus 100 according to an embodiment of the present invention. Referring to FIG. 2, a user interface window 200 displays applications installed in the image forming apparatus 100. Specifically, a "Scan" icon, a "Copy" icon, and a "Fax" icon are displayed on an upper portion of the user interface window 200, and may be selected to provide basic services generally provided by the image forming apparatus 100. Additionally, a first service icon 220 and second service icon 230 are displayed on a lower portion of the user interface window 200, and may be selected when a user desires to use services provided by virtual applications installed in the image forming apparatus 100 according to aspects of the present invention. In more detail, if the first service icon 220 is selected, a service to display contents read from a specific web page is provided. If the second service icon 230 is selected, a service to access a specific web page is provided. The service corresponding to the first service icon 220 provides dictionary contents read from a web page that provides a dictionary application in a web page form. The dictionary contents are read from the web page and stored in the image forming apparatus 100, such that the image forming apparatus 100 provides the dictionary service even if not connected to the web page (i.e., even in an off-line mode). The service corresponding to the second service icon 230 accesses a specific web page and displays the accessed web page. If the second service icon 230 is selected, a predetermined web page may be laid out on a current web page and may then be displayed. In this situation, only the text contents of the predetermined web page may also be displayed according to preset set values. Examples include a help file, a user manual file, a repair request service, etc. Additionally, a "Manage" icon 210 is used to display and manage various virtual applications installed in the image forming apparatus 100. If a user selects the "Manage" icon 210, a user interface window 300 may be displayed, as shown in FIG. 3.

FIG. 3 illustrates the user interface window 300 displayed when the user selects the "Manage" icon 210. Referring to FIG. 3, the user interface window 300 includes a first field 310 to display various virtual applications currently installed in the image forming apparatus 100, and a second field 320 to receive various user control commands to control the virtual applications. In the example illustrated in FIG. 3, two applications are currently installed in the image forming apparatus 100, and the user interface window 300 displays a "custom App 1" icon 311 and a "custom App 2" icon 312 in the form of a list. Additionally, the currently installed virtual applications may be displayed using the icons of FIG. 2. The second field 320 includes an "Execute" command icon 321, an "Interrupt" command icon 322, an "Install" command icon 323, a "Delete" command icon 324, and a "Modify" command icon 325, though it is understood that aspects of the present invention are not limited thereto. For example, according to other aspects, additional and/or alternative command icons may be provided (such as a "Copy" command icon, a "Move" command icon, etc.). An "Execute" command, an "Interrupt" command, an "Install" command, a "Delete" command, and a "Modify" command respectively corresponding to icons 321 to 325 are now described in detail below.

The "Execute" command executes a virtual application that is currently installed in the image forming apparatus 100 but not executed. The "Interrupt" command interrupts operation of a virtual application currently executed in the image forming apparatus 100. For example, if a user selects the "Interrupt" command icon 322 when the first service icon 220 has been selected, although the dictionary application is not be deleted from the image forming apparatus 100, the dictionary service provided by the dictionary application is interrupted. The "Install: command installs a new virtual application. For example, if the user selects the "Install" command icon 323, the user may be provided with information regarding a web application, and a new virtual application is installed in the image forming apparatus 100 in the process described above. The "Delete" command deletes a virtual application selected by a user from among the virtual applications currently installed in the image forming apparatus 100 from a current platform. The "Modify" command modifies icons for virtual applications currently installed in the image forming apparatus 100, or set values such as update settings. Therefore, it is possible for a user to easily install various virtual applications in the image forming apparatus 100, to be provided with various web application services using the installed virtual applications, and to readily manage the installed virtual applications.

Figure 4:
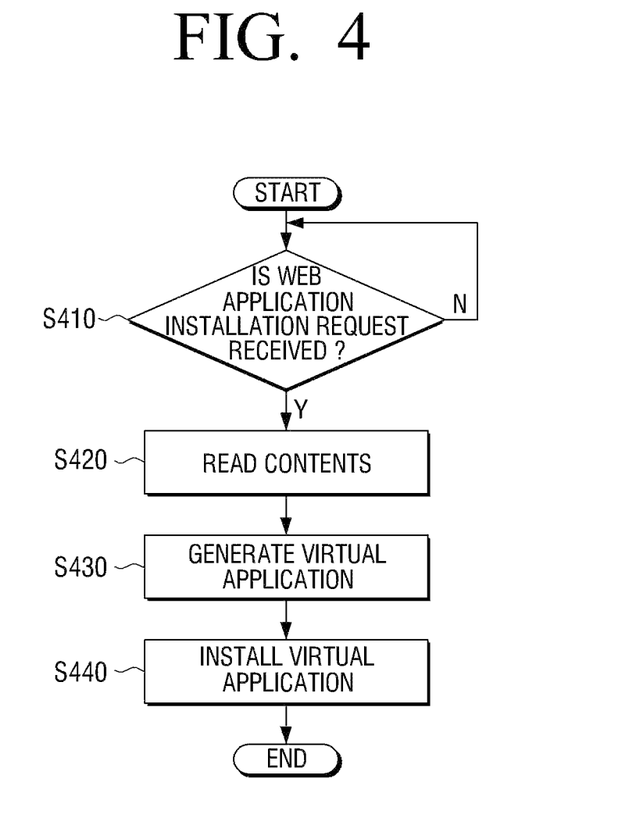
FIG. 4 illustrates a flowchart of a web application installing method according to an embodiment of the present invention.
Figure 5:
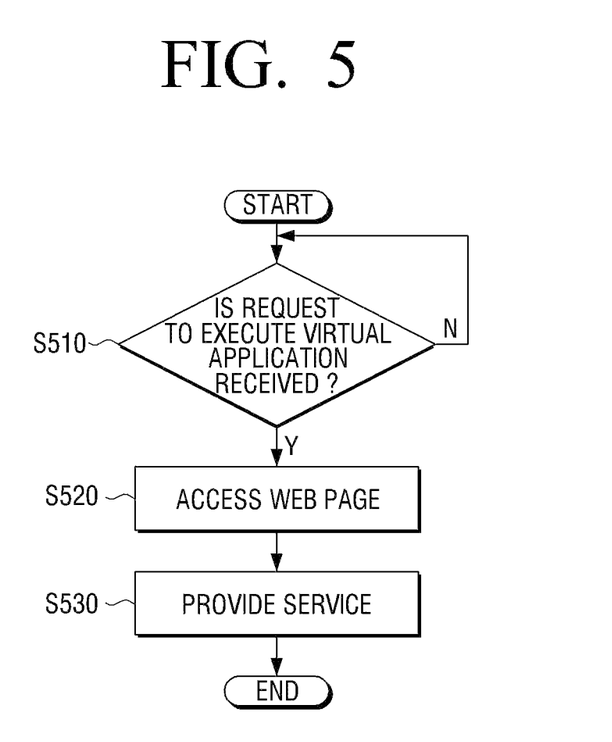
FIG. 5 illustrates a flowchart of a method to provide a web application service according to an embodiment of the present invention.

FIGS. 4 and 5 illustrate flowcharts of a web application processing method according to an embodiment of the present invention. FIG. 4 illustrates a flowchart of a web application installing method according to an embodiment of the present invention. Referring to FIG. 4, in operation 410, the apparatus 100 determines if a web application installation request is received. In response to the web application installation request being received (operation S410), a web page for a web application to be installed is accessed, and contents are read from the accessed web page in operation S420. For example, if a user enters a command to install a web application, a web page corresponding to the web application may be accessed using input web application information (i.e., a web page URL at which the web application is stored). In operation S420, all of the contents contained in the web page may be read, or only some of the contents may be according to web page information set by a user, using HTML information in the web page. That is, if a web page is written in a markup language (such as HTML), information regarding a title, a link, images, and icons of the web page may be defined as tags. Accordingly, the contents contained in the web page may be classified using the HTML information in the web page, and all of the contents or only some of the contents may be read according to user selection or preset conditions. Additionally, a web page address, a web page title, and/or web page icons among the read contents may be used as icons for virtual applications generated in the process that will be described later. If a web page corresponding to a web application includes a link, another web page linked to the web page may be accessed, and contents may be read from the accessed web page. Additionally, if the web page corresponding to the web application contains a plurality of links, all web pages within a preset range of stages of the plurality of links may be accessed, and contents may be read from the accessed web pages.

Subsequently, a virtual application corresponding to the web application is generated using the read contents in operation S430. For example, the virtual application may be an application to display a predetermined web page, an application to display prestored contents, or a combination application thereof. Operation S430 is performed in a similar manner as the operation of the virtualization engine 150 described above, so no further description is herein provided.

The generated virtual application is installed in operation S440. The generated virtual application may be installed in the open architecture platform of the image forming apparatus 100. The operation of installing the virtual application in the open architecture platform is performed in a similar manner as the operation of installing a general extension application in a platform, so no further description is herein provided. Additionally, it is possible to manage services provided by installed virtual applications according to user commands to manage the installed virtual applications, of which detailed description has been given above with reference to FIG. 3.

FIG. 5 illustrates a flowchart of a method to provide a web application service according to an embodiment of the present invention. If a virtual application is installed using the method of FIG. 4, an icon corresponding to the installed virtual application may be displayed, such as those shown in FIG. 2. In this situation, information regarding the URL and/or a title of the web page among the contents read from the web page may be displayed in the form of icons. Referring to FIG. 5, if a request to execute the installed virtual application (for example, if the user selects the displayed icon and/or an execute icon 321) is received in operation S510, a web page is accessed by a service provided by the installed virtual application in operation S520, and a service to display stored contents are provided in operation S530. In more detail, if the user selects the displayed icon, contents read from a web page for the installed virtual application may be displayed, or only specific contents read from the web page may be displayed. Additionally, the web page for the installed virtual application may be accessed and the accessed web page may be displayed so that the user may be provided with the web page. In this situation, only some of the contents of the web page may be displayed according to the set values used to install the virtual application.

According to aspects of the present invention, it is possible to print the read contents or the currently displayed contents. Additionally, it is possible to access the web page for the installed virtual application in preset regular intervals, and to update contents associated with the installed virtual application. If the web page for the installed virtual application is accessed and updated in preset regular intervals according to a user command for the installed virtual application, the installed virtual application may be updated as well. Therefore, according to aspects of the present invention, it is possible to easily install a virtual application and provide various web application services through the installed virtual application using the web application processing method of FIGS. 4 and 5. Additionally, the web application processing method of FIGS. 4 and 5 may be performed on an image forming apparatus having a configuration identical to or different from that of FIG. 1.

While not restricted thereto, aspects of the present invention can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A web application installing method of an image forming apparatus having a printing capability, the method comprising:
   accessing, from the image forming apparatus, a web page for a web application using web application information regarding the web application;
   reading, by the image forming apparatus, contents from the accessed web page;
   generating, within the image forming apparatus, a virtual application corresponding to the web application using the read contents; and
   installing the generated virtual application in the image forming apparatus, and
   displaying, on a display of the image forming apparatus, an icon for running the generated virtual application.

2. The method as claimed in claim 1, wherein the reading of the contents comprises reading the contents using HyperText Markup Language (HTML) information in the web page.

3. The method as claimed in claim 1, wherein the contents comprise a uniform resource locator (URL) of the web page, a title of the web page, and/or one or more icons of the web page.

4. The method as claimed in claim 1, wherein the reading of the contents comprises reading some or all of contents from the web page, and some or all of contents from another web page linked to the web page.

5. The method as claimed in claim 1, wherein the virtual application is an application to display the read contents and/or the web page.

6. The method as claimed in claim 1, further comprising:
   receiving a request to execute the installed virtual application; and
   providing a service associated with the virtual application in response to the receiving of the request.

7. The method as claimed in claim 6, wherein the providing of the service comprises displaying, on the display, the contents read from the web page corresponding to the virtual application, or displaying, on the display, some contents from among the read contents in accordance with a user's selection.

8. The method as claimed in claim 1, further comprising:
   accessing the web page corresponding to the installed virtual application in preset regular intervals, and updating the contents associated with the installed virtual application according to changes to the web page.

9. The method as claimed in claim 1, further comprising:
   managing a service associated with the virtual application in response to a command to manage the installed virtual application.

10. The method as claimed in claim 1, further comprising:
    receiving the web application information from a web server storing the web page or from a user input to the image forming apparatus.

11. The method as claimed in claim 1, further comprising:
displaying, on the image forming apparatus, a user interface window comprising an icon to execute the installed virtual application, an icon to interrupt execution of the installed virtual application, an icon to install the virtual application, an icon to delete the installed virtual application, and/or an icon to modify the installed virtual application; and
executing, interrupting, installing, deleting, or modifying the virtual application according to a user input to the user interface window.

12. An image forming apparatus comprising:
a user interface to receive web application information regarding a web application;
a communication interface to access a web page for the web application using the web application information;
a contents reader to read contents from the web page;
a virtualization engine to generate a virtual application corresponding to the web application using the read contents;
a controller to install the generated virtual application in the image forming apparatus; and
a print unit to print data,
wherein the user interface displays an icon to run the generated virtual application.

13. The image forming apparatus as claimed in claim 12, wherein the contents reader reads the contents using HyperText Markup Language (HTML) information in the web page.

14. The image forming apparatus as claimed in claim 12, wherein the contents reader reads some or all of contents from the web page, and some or all of contents from another web page linked to the web page.

15. The image forming apparatus as claimed in claim 12, wherein the virtual application is an application to display the read contents and/or the web page.

16. The image forming apparatus as claimed in claim 12, wherein, when receiving a request to execute the installed virtual application, the controller provides a service associated with the virtual application.

17. The image forming apparatus as claimed in claim 16, wherein the controller displays the contents read from the web page corresponding to the virtual application, or displays some contents from among the read contents in accordance with a user's selection.

18. The image forming apparatus as claimed in claim 12, wherein the controller accesses the web page corresponding to the installed virtual application in preset regular intervals, and updates the contents associated with the installed virtual application according to changes to the web page.

19. The image forming apparatus as claimed in claim 12, wherein the controller manages a service associated with the virtual application in response to a command to manage the installed virtual application.

20. The image forming apparatus as claimed in claim 12, wherein the user interface receives the web application information from a web server storing the web page.

21. A web application installing method of an image forming apparatus having a printing unit to print data, the method comprising:
generating, within the image forming apparatus, a virtual application corresponding to a web application of a web page using contents read from the web page accessed by the image forming apparatus; and
installing the generated virtual application in the image forming apparatus, and
displaying, on a display of the image forming apparatus, an icon for running the generated virtual application.

* * * * *